(12) United States Patent
Tsutsumi (10) Patent No.: US 8,189,213 B2
(45) Date of Patent: May 29, 2012

(54) IMAGE FORMING APPARATUS CAPABLE OF USING SECURITY CODE FOR COMMUNICATION

(75) Inventor: Takahiro Tsutsumi, Toyohashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1439 days.

(21) Appl. No.: 11/651,085

(22) Filed: Jan. 9, 2007

(65) Prior Publication Data
US 2007/0216937 A1 Sep. 20, 2007

(30) Foreign Application Priority Data

Mar. 15, 2006 (JP) ................................. 2006-071544

(51) Int. Cl.
 *G06K 15/00* (2006.01)
 *G06F 3/12* (2006.01)
 *H04N 1/40* (2006.01)
(52) U.S. Cl. ....................... 358/1.14; 358/1.15; 358/3.28
(58) Field of Classification Search .................. 358/1.15, 358/1.14, 3.28
See application file for complete search history.

(56) References Cited

U.S. PATENT DOCUMENTS

| | | | |
|---|---|---|---|
| 5,473,691 A | 12/1995 | Menezes et al. | |
| 6,175,714 B1 | 1/2001 | Crean | |
| 6,741,758 B2* | 5/2004 | Hayashi et al. | 382/294 |
| 6,765,688 B1* | 7/2004 | Claiborne | 358/1.18 |
| 6,983,056 B1* | 1/2006 | Amano | 382/100 |
| 7,113,615 B2* | 9/2006 | Rhoads et al. | 382/100 |
| 7,130,086 B2* | 10/2006 | Ohara | 358/3.28 |
| 2001/0007130 A1 | 7/2001 | Takaragi | |
| 2003/0107771 A1 | 6/2003 | Shibata | |
| 2006/0072782 A1 | 4/2006 | Abe et al. | |
| 2006/0236113 A1 | 10/2006 | Uzawa | |
| 2007/0052730 A1 | 3/2007 | Patterson et al. | |
| 2007/0216937 A1* | 9/2007 | Tsutsumi | 358/1.15 |
| 2007/0242312 A1 | 10/2007 | Tsutsumi | |

FOREIGN PATENT DOCUMENTS

| | | |
|---|---|---|
| JP | 3-55963 | 3/1991 |
| JP | 6-284233 | 10/1994 |
| JP | 8-131198 | 5/1996 |
| JP | 9-298669 | 11/1997 |
| JP | 10-304176 | 11/1998 |
| JP | 2002-218220 | 8/2002 |

(Continued)

OTHER PUBLICATIONS

Japanese Notice of Grounds of Rejection mailed Nov. 20, 2007, directed to counterpart JP application No. 2006-071544; 6 pages.

(Continued)

*Primary Examiner* — Benny Q Tieu
*Assistant Examiner* — Sunil Chacko
(74) *Attorney, Agent, or Firm* — Morrison & Foerster LLP (57) ABSTRACT

On receiving FAX image data, an image forming apparatus determines whether or not a security code is superimposed on the image data. If superimposed, the image forming apparatus stored the content of the security code and erases the superimposed security code from the image. Thereafter, the image forming apparatus creates a higher-resolution security code including the same information as that of the stored security code. The FAX image is converted into a higher-resolution image. The higher-resolution security code is superimposed on the FAX image with a higher resolution resulted from the conversion, and the resultant FAX image is printed.

10 Claims, 8 Drawing Sheets

FOREIGN PATENT DOCUMENTS

| | | |
|---|---|---|
| JP | 2003-179707 | 6/2003 |
| JP | 2003-337687 | 11/2003 |
| JP | 2004-260606 | 9/2004 |
| JP | 2005-012623 | 1/2005 |
| JP | 2005-199486 | 7/2005 |
| JP | 2005-260483 | 9/2005 |

OTHER PUBLICATIONS

Japanese Office Action mailed Jan. 8, 2008, directed to Japanese Patent Application No. 069267/2006; 4 pages.

Japanese Office Action dated Apr. 8, 2008 directed to a related Japanese Application; 6 pages.

Tsutsumi, T., U.S. Office Action mailed Mar. 31, 2010, directed to related U.S. Appl. No. 11/648,687; 12 pages.

Tsutsumi, T., U.S. Office Action mailed Aug. 12, 2009, directed to U.S. Appl. No. 11/648,687; 12 pages.

Japanese Notice of Grounds of Rejection dated Aug. 7, 2007, directed to counterpart JP application No. 2006-071544.

Tsutsumi, T., U.S. Office Action mailed Jul. 21, 2010, directed to U.S. Appl. No. 11/648,687; 21 pages.

Tsutsumi, T., U.S. Office Action mailed Dec. 28, 2010, directed to U.S. Appl. No. 11/648,687; 20 pages.

Tsutsumi, T., U.S. Office Action mailed Jul. 12, 2011, directed to U.S. Appl. No. 11/648,687; 23 pages.

Tsutsumi, T., U.S. Office Action mailed Jan. 25, 2012, directed to U.S. Appl. No. 11/648,687; 24 pages.

* cited by examiner

[DURING TRANSMISSION]
LOW-RESOLUTION
SECURITY CODE IS ADDED

[AFTER RECEPTION]
SECURITY CODE IS READ
AND ERASED

[DURING OUTPUTTING]
HIGH-RESOLUTION
SECURITY CODE IS ADDED

IMAGE FORMING APPARATUS CAPABLE OF USING SECURITY CODE FOR COMMUNICATION

This application is based on Japanese Patent Application No. 2006-071544 filed with the Japan Patent Office on Mar. 15, 2006, the entire content of which is hereby incorporated by reference.

BACKGROUND OF THE INVENTION

1. Field of the Invention

The present invention relates to an image forming apparatus, a method for controlling the image forming apparatus, and a program for controlling the image forming apparatus, and, in particular, to an image forming apparatus capable of using a security code for communication, a method for controlling the image forming apparatus, and a program for controlling the image forming apparatus.

2. Description of the Related Art

Conventional image forming apparatuses (such as MFP (Multi Function Peripherals) and facsimile apparatuses) having a FAX (facsimile) transmission/reception function generally have a function of performing FAX transmission with low resolutions, in order to reduce the amount of image data during FAX transmission.

Japanese Laid-Open Patent Publication No. 09-298669 discloses a facsimile apparatus which recognizes data included in a dedicated transmission card transmitted thereto along with a document and, if it determines from the data that the confidentiality of the document should be protected, adds a security code to the image information and stores it in a storage device.

It is also possible to embed a security code such as a tint-block code in image data, in performing FAX transmission. It is desirable that such a security code is constituted by fine dots and the like, in order to prevent the security code from being easily recognized.

A problem has been noted in a conventional FAX transmission/reception method that, because image data including a security code embedded therein is transmitted and received at low resolutions, the received security code becomes coarse, and thus a security code cannot be formed in a manner that is difficult to be visually observed.

SUMMARY OF THE INVENTION

An object of the present invention is to provide an image forming apparatus capable of superimposing a proper security code on an image, a method for controlling the image forming apparatus and a program for controlling the image forming apparatus.

According to an aspect of the present invention, in order to arraign the aforementioned object, there is provided an image forming apparatus which receives facsimile information and outputs a printed image, the image forming apparatus including: a security-code reading portion for reading a security code superimposed on received facsimile image data; a security-code erasing portion for erasing the security code from the image data; a first security code creating portion for converting the content of the read security cord into a security code with a different resolution; an image-data resolution converting portion for converting the image data in terms of resolution; and a first security-code superimposing portion for superimposing the security code resulted from the conversion on the image data which has been converted in terms of resolution.

According to another aspect, there is provided an image forming apparatus which receives facsimile information and outputs a printed image, the image forming apparatus including: a security-information identification portion for identifying security information included in a received facsimile protocol; a security-code creating portion for creating a security code on the basis of the security information; an image-data resolution converting portion for converting received facsimile image data in terms of resolution; and a security-code superimposing portion for superimposing the created security code on the image data which has been converted in terms of resolution.

According to a different aspect of the present invention, there is provided an image forming apparatus capable of transmitting an image as facsimile information, the image forming apparatus including: an embedding portion for creating a security code and embedding the security code in image data to be transmitted; a transmitting portion for transmitting the image data including the security code embedded therein; a security-information transmission method determining portion for determining whether or not the apparatus at the reception side is capable of receiving security information as a protocol; a security-information transmitting portion for transmitting security information as a protocol; and a security-information transmission method selecting portion for, if the apparatus at the reception side is capable of receiving security information as a protocol, transmitting security information as a protocol or otherwise superimposing a security code on image data and then transmitting the image data.

According to further a different aspect of the present invention, there is provided a method for controlling an image forming apparatus which receives facsimile information and outputs a printed image, the method including: a security-code reading step of reading a security code superimposed on received facsimile image data; a security-code erasure step of erasing the security code from the image data; a security-code creating step of converting the content of the read security cord into a security code with a different resolution; an image-data resolution conversion step of converting the image data in terms of resolution; and a security-code superimposing step of superimposing the security code resulted from the conversion on the image data which has been converted in terms of resolution.

According to further a different aspect of the present invention, there is provided a method for controlling an image forming apparatus which receives facsimile information and outputs a printed image, the method including: a security-information identification step of identifying security information included in the protocol of a received facsimile; a security-code creating step of creating a security code on the basis of the security information; an image-data resolution conversion step of converting the image data of the received facsimile, in terms of resolution; and a security-code superimposing step of superimposing the created security code on the image data which has been converted in terms of resolution.

According to further a different aspect of the present invention, there is provided a method for controlling an image forming apparatus capable of transmitting an image as facsimile information, the method including: an embedding step of creating a security code and embedding the security code in image data to be transmitted; a transmission step of transmitting the image data including the security code embedded therein; a security-information transmission method determining step of determining whether or not the apparatus at the reception side is capable of receiving security information as a protocol; a security-information transmission step of transmitting security information as a protocol; and a security-information transmission method selecting step of, if the apparatus at the reception side is capable of receiving security information as a protocol, transmitting security information as a protocol or otherwise superimposing a security code on image data and then transmitting the image data.

According to the aforementioned inventions, it is possible to provide an image forming apparatus capable of superimposing a proper security code on an image, a method for controlling the image forming apparatus and a program for controlling the image forming apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Hereinafter, an MFP according to a first embodiment of the present invention will be described.

The MFP according to the present embodiment is capable of transmitting and receiving faxes including security codes (security information) such as tint-block codes. In printing a FAX image including a low-resolution and high-visibility security code superimposed thereon, the MFP prints the FAX image after substituting a higher-resolution and lower-visibility security code for the low-resolution security code.

Figure 1:
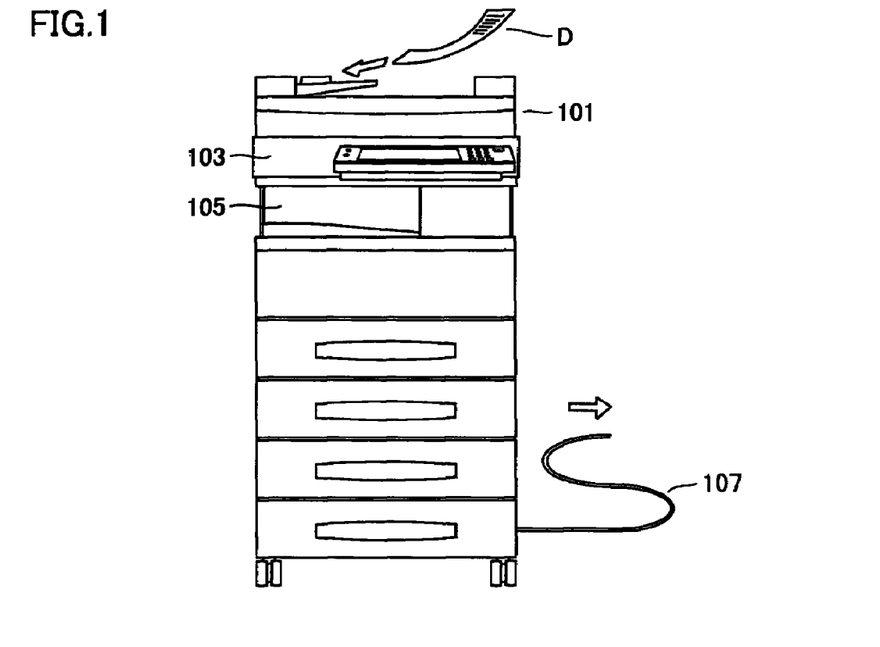
FIG. 1 is a view illustrating a FAX transmission image in an MFP.
Figure 2:
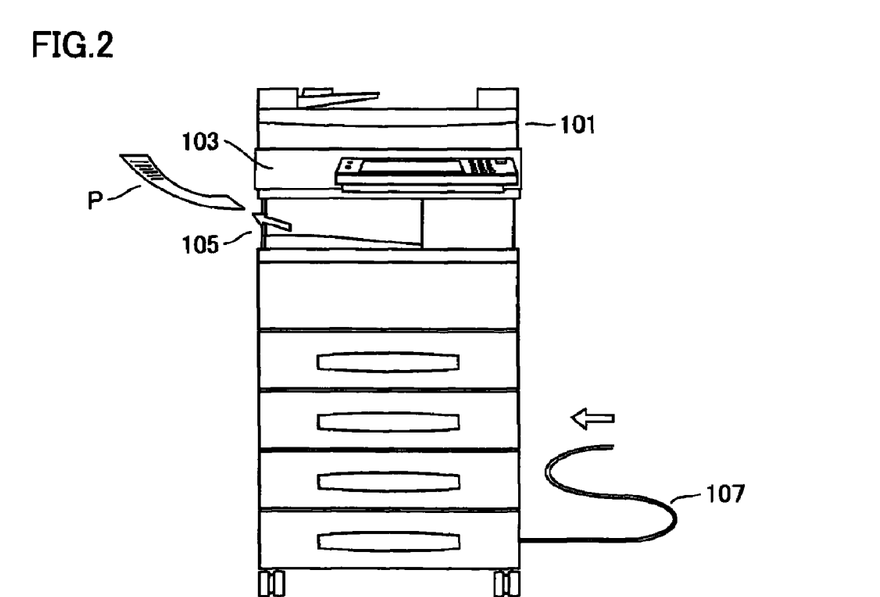
FIG. 2 is a view illustrating a FAX reception image in the MFP.

FIG. 1 is a view illustrating an image of FAX transmission in the MFP and FIG. 2 is a view illustrating an image of FAX reception in the MFP.

As illustrated in FIG. 1, during FAX transmission, a document D to be faxed is directly set on the document reading surface of a scanner 103. Also, when the MFP is equipped with an ADF (Auto Document Feeder) and an EDG (Electronic Document Handler) 101, the document D is set in the document suction port thereof to scan the document D. The scanned document is transmitted as a FAX image through a telephone line or an internet line 107.

As illustrated in FIG. 2, image data received through FAX is automatically printed by a print engine 105 or temporally stored in a memory or a hard disk drive and then is printed in response to a command for printing. This results in a printed object P.

Figure 3:
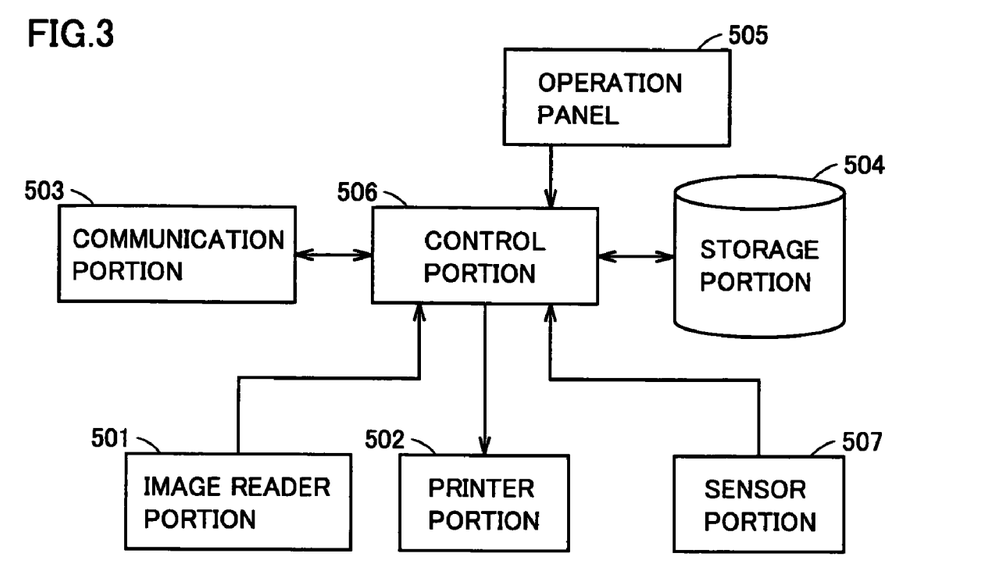
FIG. 3 is a block diagram illustrating a hardware structure of the MFP.

FIG. 3 is a block diagram illustrating the hardware structure of the MFP.

Referring to the figure, the MFP includes a control portion 506 for controlling the entire apparatus, an image reader portion 501 for reading image data from documents, a printer portion 502 for printing images on sheets, a communication portion 503 for performing wireless communication within a short range or connecting the MFP to a network or a telephone line, a storage portion 504 which stores job data and the like, an operation panel 505 which is an interface between the MFP and a user and a sensor portion 507 for detecting the remaining amounts of consumable members.

Figure 4:
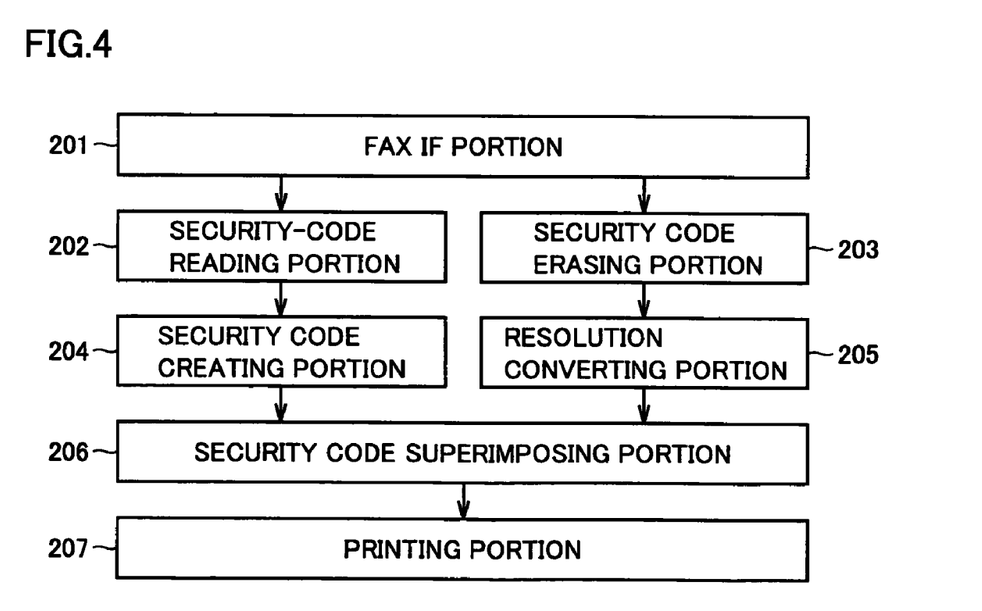
FIG. 4 is a block diagram illustrating a functional structure of the MFP.

FIG. 4 is a block diagram illustrating a functional structure of the MFP.

Referring to the figure, the MFP includes a Fax I/F portion 201 for transmitting and receiving facsimile signals, a security-code reading portion 202 for reading the content of a low-resolution security code included in an image received through the facsimile, a security-code creating portion 204 for creating a high-resolution security code on the basis of the read security code, a security-code erasing portion 203 for erasing the low-resolution security code included in the image received through the facsimile, a resolution-converting portion 205 for converting the resolution of the image received through the facsimile, a security-code superimposing portion 206 for superimposing the security code created by the security-code creating-portion 204 on the image with the converted resolution, and a printing portion 207 for printing the image including the security code superimposed thereon.

Figure 5:
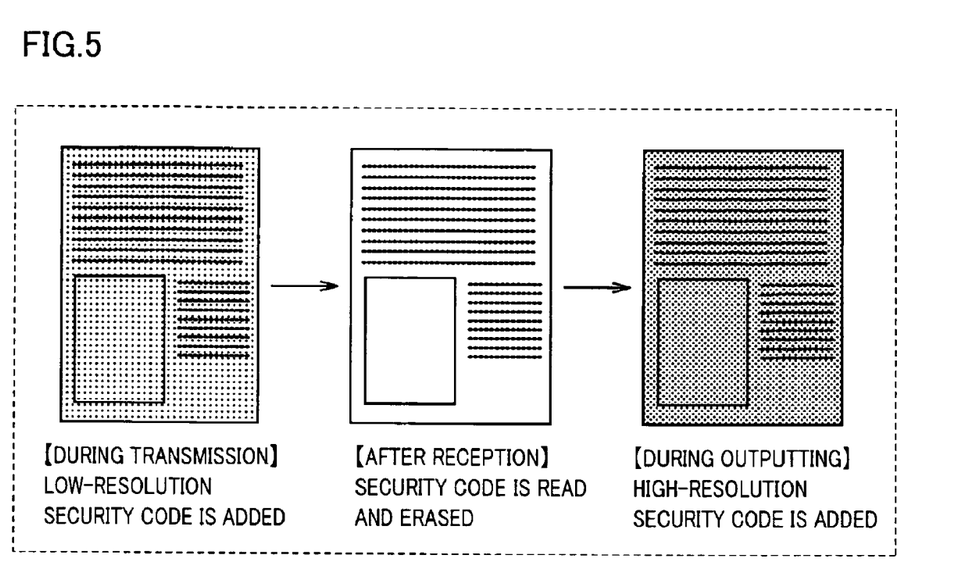
FIG. 5 is a view illustrating document images which are treated by the MFP (1) during transmission, (2) after security-code erasing processing on the received data and (3) during printing thereof.

FIG. 5 is a view illustrating document images which are treated by the MFP (1) during transmission, (2) after security-code erasing processing on the received data and (3) during printing thereof.

During the transmission, a security code is added to the image and, when the facsimile is in a low resolution mode, the security code also has a low resolution. If the low-resolution security code is directly printed after it is received, the security code will be printed as a coarse security code, thus degrading the visibility thereof Therefore, after the reception, the content of the low-resolution security code is read and, thereafter, the security code is erased.

During printing, a FAX image with a low resolution is converted in terms of resolution into a high-resolution image. The content of the erased security code is converted into a high-resolution security code according to the resolution of the FAX image and, then, the high-resolution security code is superimposed on the FAX image.

A case where an original security code has a resolution of, for example, 600 dpi will be considered. If it is assumed that the resolution of the security code is changed to 200 dpi during FAX transmission, in order to embed a security code having the same amount of data as the security code with a resolution of 600 dpi, there is a need for triple sizes in both the main direction and the widthwise direction, which causes the security code to be a coarse image which is easily recognized by human eyes, thereby impeding the reading of the document.

Therefore, if the MFP according to the present embodiment receives a FAX image including a security code embedded therein, the MFP recognizes the superimposed security code and thereafter erases the security code. The recognized security code is converted into a high-resolution security code which can not be easily recognized by human eyes, and the converted security code is embedded in the FAX image, again, and then the FAX image is printed.

Figure 6:
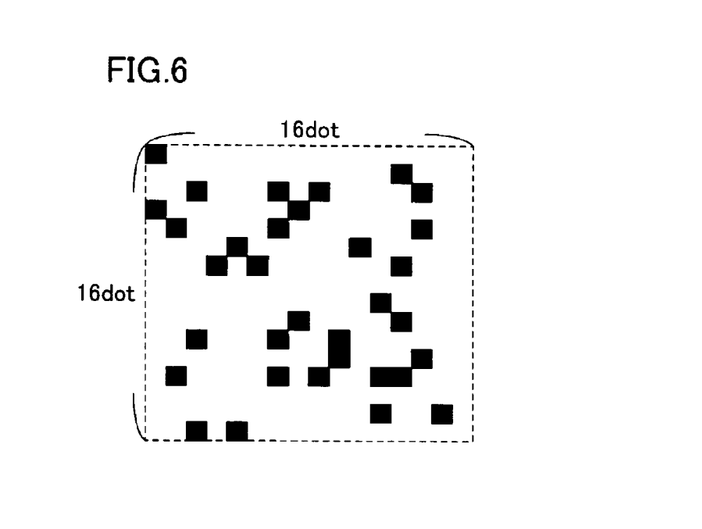
FIG. 6 is a view illustrating a concrete example of a security code.

FIG. 6 is a view illustrating a concrete example of a security code.

For example, by generating a security code in a unit consisting of 16 dots×16 dots as illustrated in FIG. 6, it is possible to include data of 16×16=256 bits therein, since each single-bit data can be expressed by marking or not marking the corresponding single dot.

Such a security code is repeatedly embedded over the entire surface of an image or a portion thereof (for example, the periphery of a document). As a method for embedding a security code in a portion of a document, there is possibly a method which makes a comparison between the lightness value of the document and a threshold value. Namely, the lightness Y can be determined from RGB values of the document, then the lightness Y can be compared with a threshold value Th, and a security code can be printed on only the portions which satisfy a condition of Y>Th, which enables selectively embedding the security code in the document at portions having higher lightness values and therefore having white grounds. With this processing, a security code is not superimposed on the entire surface of a document, thereby preventing the reduction of the amount of information which is originally included in the document.

Figure 7:
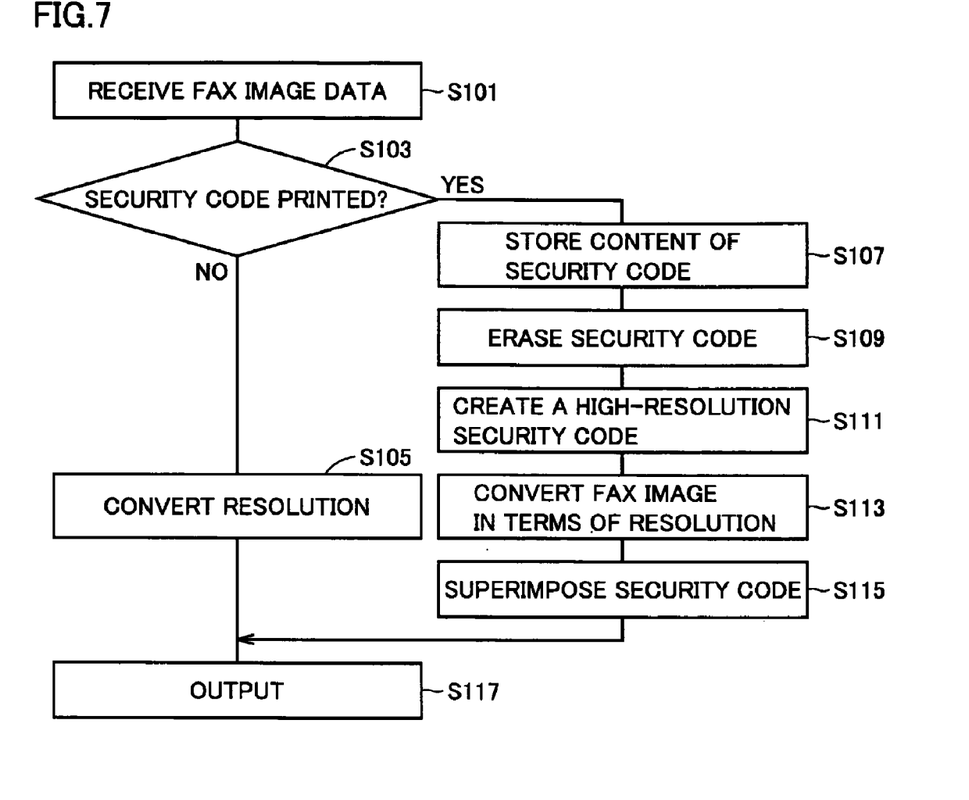
FIG. 7 is a flowchart illustrating facsimile reception processing in the MFP according to the present embodiment.

FIG. 7 is a flowchart illustrating facsimile receiving processing in the MFP according to the present embodiment.

At a step S101, Fax I/F portion 201 receives Fax image data. At a step S103, security-code reading portion 202 determines whether or not a security code is superimposed on the received data. If a security code is superimposed thereon (step S103 results in YES), security-code reading portion 202 stores the content of the security code at a step S107. The security code is read by determining, from the resolution, the region where the security code is repeatedly provided (16×16 dots in the case of FIG. 6) and recognizing the isolated-dot pattern.

At a step S109, security-code erasing portion 203 erases the superimposed security code from the FAX image. During the erasing, since the original data has been lost at the portions on which the security code is superimposed, pixels are created thereat through interpolating processing with proximal pixels.

At a step S111, security-code creating portion 204 creates a higher-resolution security code including the same information as that of the read security code. At a step S113, resolution converting portion 205 converts the FAX image into a higher-resolution image.

At a step S115, security-code superimposing portion 206 superimposes the higher-resolution security code on the FAX image with the higher-resolution which has been converted. The superimposition is performed by substituting a black color for the portions of the FAX image corresponding to the black dots of the security code.

At a step S117, printing portion 207 prints the image including the security code superimposed thereon.

Further, if step S103 results in NO, resolution converting portion 205 converts the FAX image into a higher-resolution image at a step S105 and the higher-resolution image is printed at step S117.

With the aforementioned processing, it is possible to erase a low-resolution security code from image information and superimpose a higher-resolution security code with lower visibility on the image information.

Second Embodiment

Figure 8:
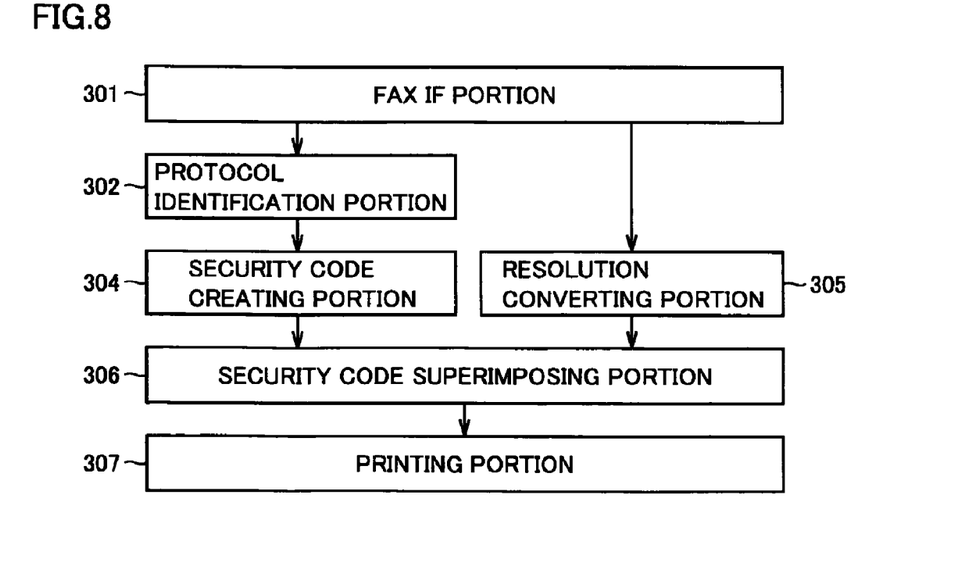
FIG. 8 is a block diagram illustrating the functional structure of an MFP according to a second embodiment.

FIG. 8 is a block diagram illustrating the functional structure of an MFP according to a second embodiment.

Referring to the figure, the MFP includes a Fax I/F portion 301 for receiving facsimile signals, a protocol identification portion 302 for identifying the protocol included in data received through the facsimile, a security-code creating portion 304 for creating a high-resolution security code on the basis of the identified protocol, a resolution converting portion 305 for converting, in terms of resolution, the image received through the facsimile, a security-code superimposing portion 306 for superimposing the security code created by security-code creating portion 304 on the image which has been converted in terms of resolution, and a printing portion 307 for printing the image including the security code superimposed thereon.

In the present embodiment, security-code information is included in a FAX protocol and, on the basis thereof, the MFP at the reception side creates a high-resolution security code and superimposes it on a FAX image.

Figure 9:
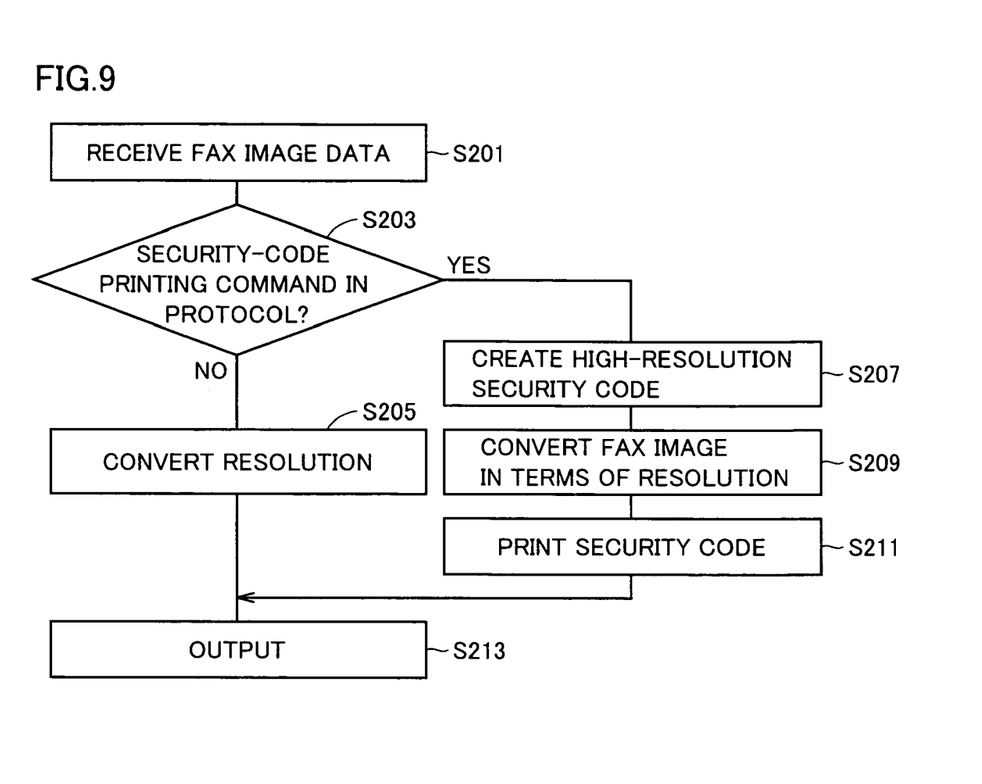
FIG. 9 is a flowchart illustrating facsimile reception processing in an MFP according to the second embodiment.

FIG. 9 is a flowchart illustrating facsimile reception processing in the MFP according to the present embodiment.

At a step S201, Fax I/F portion 301 receives Fax image data. At a step S203, protocol identification portion 302 determines whether or not security information is included in the protocol and, if included (step S203 results in YES), stores the security information. At a step S207, security-code creating portion 304 creates a higher-resolution security code including the same information as that of the read security code.

At a step S209, resolution converting portion 305 converts the FAX image into a higher-resolution image. At a step S211, security-code superimposing portion 306 superimposes the higher-resolution security code on the FAX image which has been converted in terms of resolution to create an image including the security code superimposed thereon.

At a step S213, printing portion 307 prints the image resulted from step S211.

Also, if step S203 results in NO, resolution converting portion 305 converts the FAX image into a higher-resolution image at a step S205 and the higher-resolution image is printed at a step S213.

With the aforementioned processing, the MFP at the reception side is enabled to superimpose a higher-resolution security code with lower visibility on an image.

Third Embodiment

Figure 10:
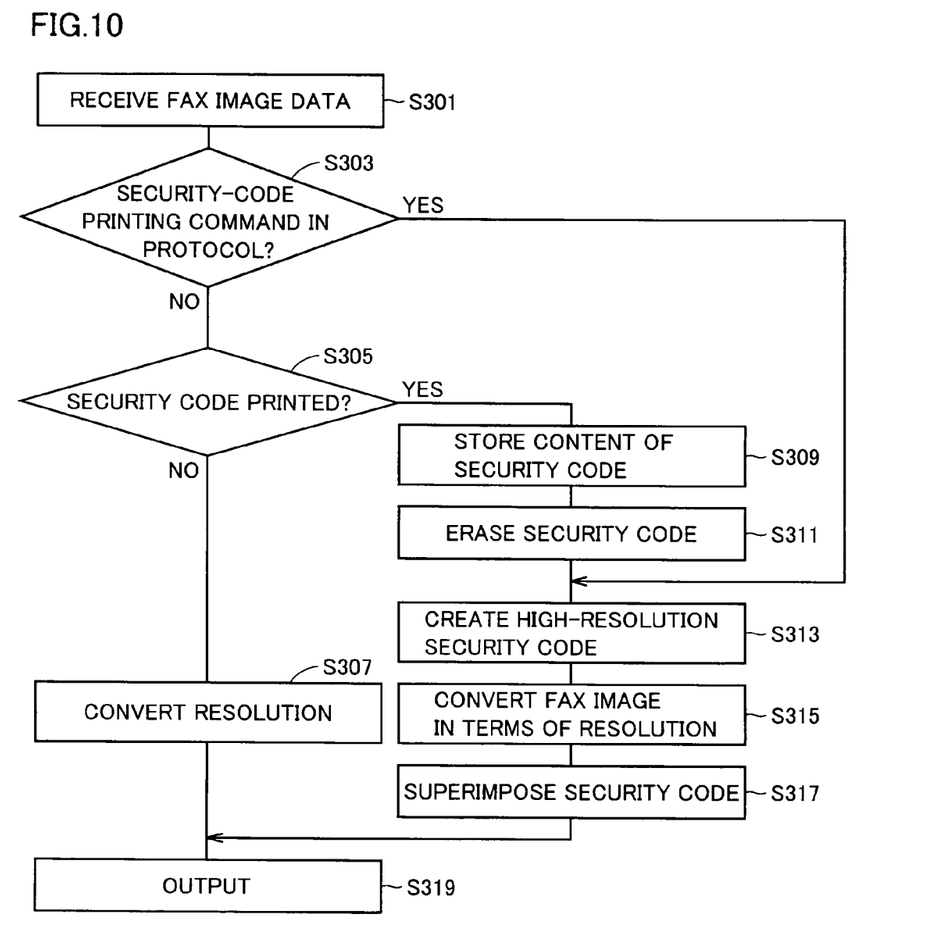
FIG. 10 is a flowchart illustrating facsimile reception processing in an MFP according to a third embodiment.

FIG. 10 is a flowchart illustrating facsimile reception processing in an MFP according to a third embodiment.

The MFP according to the present embodiment executes both the processing methods which are executed in the MFPs according to the first and second embodiments.

At a step S301, the Fax I/F portion receives Fax image data. At a step S303, the protocol identification portion determines whether or not security code information is included in the protocol and, if included (step S303 results in YES), stores the content of the security code. Thereafter, at a step S313, the security-code creating portion creates a higher-resolution security code including the same information as that of the read security code.

At a step S315, the resolution converting portion converts the FAX image into a higher-resolution image. At a step S317, the security-code superimposing portion superimposes the higher-resolution security code on the higher-resolution FAX image which has been converted to create an image including the security code superimposed thereon.

At a step S319, the printing portion prints the image resulted from step S317.

Also, if step S303 results in NO, the security-code reading portion determines whether or not a security code is superimposed on the received data, at a step S305. If a security code is superimposed thereon (step S305 results in YES), the security-code reading portion stores the content of the security code, at a step S309. At a step S311, the security-code erasing portion erases the superimposed security code from the FAX image. At a step S313, the security-code creating portion creates a higher-resolution security code including the same information as that of the read security code. Thereafter, the processes from step S315 are performed.

If step S305 results in NO, the resolution converting portion converts the FAX image into a higher-resolution image at a step S307 and the higher-resolution image is printed at step S319.

Fourth Embodiment

While, in the aforementioned flowchart according to the third embodiment, the MFP at the reception side determines whether it should print a higher-resolution security code on the basis of the protocol or a low-resolution security code, the MFP at the transmission side may grasp the functions of the MFP at the reception side and, on the basis of the functions, the MFP at the transmission side may select generating a command for printing a higher-resolution code through a protocol or transmitting image data including a low-resolution security code superimposed thereon.

That is, the MFP at the transmission side has the function of determining whether or not the MFP at the reception side is capable of identifying security codes from protocols. In the case where the MFP at the transmission side transmits a fax to an MFP capable of identifying security codes, the MFP at the transmission side embeds a security code only in a protocol without superimposing it on an image. In the case where the MFP at the transmission side transmits a fax to an MFP which is not capable of identifying security codes from protocols, the MFP at the transmission side superimposes a security code on an image.

Figure 11:
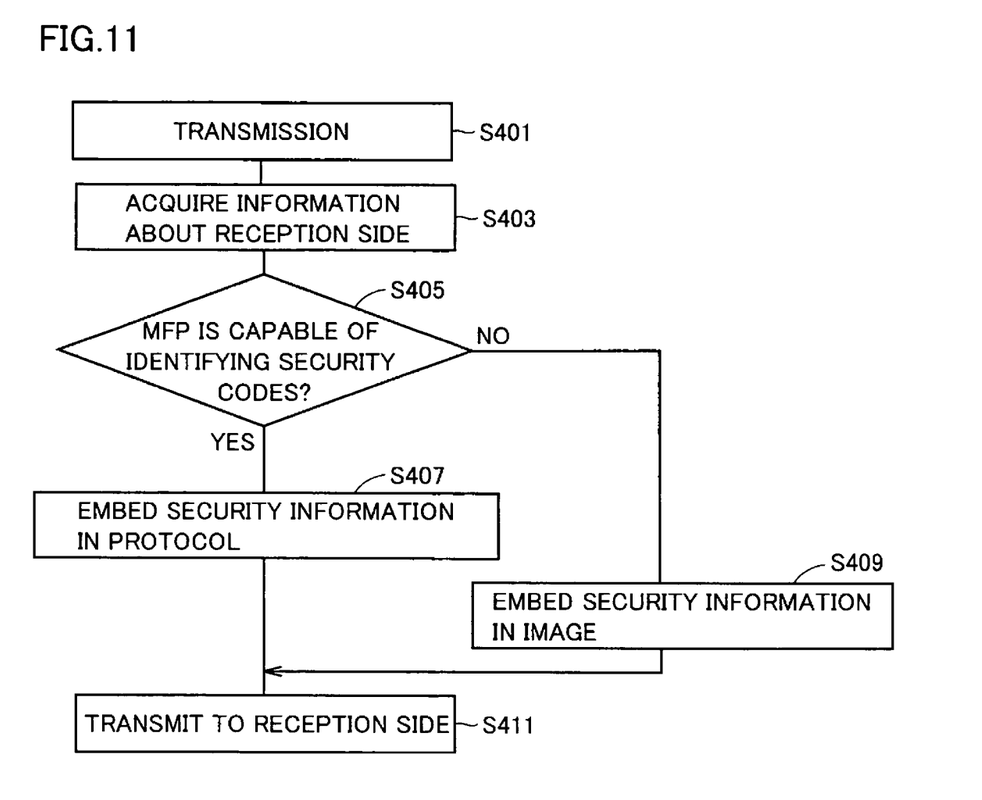
FIG. 11 is a flowchart illustrating transmission processing in an MFP according to a fourth embodiment.

FIG. 11 is a flowchart illustrating transmission processing in an MFP according to a fourth embodiment.

Referring to the figure, if it is determined at a step S401 that facsimile transmission should be performed, information about the functions of the MFP at the reception side is acquired at a step S403. At a step S405, it is determined whether or not the MFP at the reception side is an MFP capable of identifying security information from protocols and, if the determination results in YES, security information is embedded in a protocol at a step S407 and a fax is transmitted to the MFP at the reception side, at a step S411.

On the other hand, if step S405 results in NO, security information is embedded in an image at a step S409, and the image is transmitted through the facsimile to the MFP at the reception side at a step S411.

The MFP at the reception side identifies the security information in the protocol, then converts the input image in terms of resolution, superimposes a higher-resolution security code on the image and outputs the image, which can prevent the degradation of the image along with the removal of the low-resolution security code. Also, even in the case where the MFP at the reception side is not capable of identifying security information in protocols, the MFP at the reception side can receive an image including a security code superimposed thereon. Even in the case where the MFP at the reception side is not capable of identifying security codes superimposed on images, the aforementioned transmission processing can offer a security protecting function, since a security code is superimposed on the image even though it has a low resolution.

Fifth Embodiment

Figure 12:
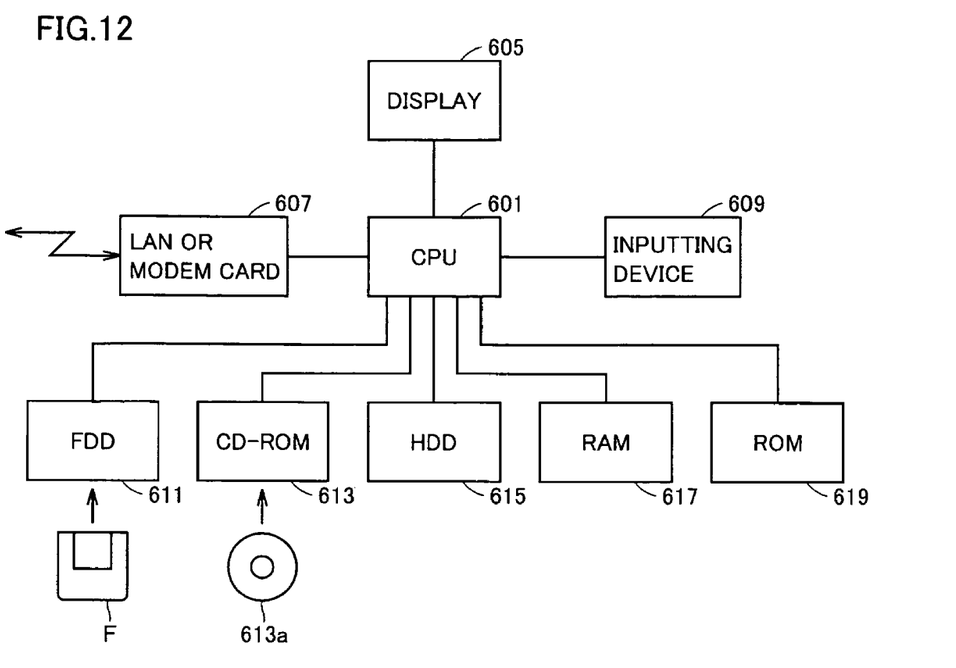
FIG. 12 is a block diagram illustrating the structure of a computer apparatus according to a fifth embodiment.

FIG. 12 is a block diagram illustrating the structure of a computer apparatus according to a fifth embodiment of the present invention.

Referring to the figure, the computer apparatus includes a CPU 601 for controlling the entire apparatus, a display 605, a LAN (local area network) card 607 (or a modem card) for connecting the apparatus to a network or communicating with the outside, an inputting device 609 constituted by a keyboard and a mouse and the like, a flexible disk drive 611, a CD-ROM drive 613, a hard disk drive 615, a RAM 617 and a ROM 619.

Flexible disk drive 611 is capable of reading data such as programs and images recorded on a flexible disk F, and CD-ROM drive 613 is capable of reading data such as programs and images recorded on a CD-ROM 613a.

The programs execute the processes illustrated in the aforementioned flowcharts for processing received image data or performing FAX transmission.

Effects of Embodiments

As described above, with the embodiments according to the present invention, even when an MFP transmits a low-resolution FAX image including a security code superimposed thereon, the image forming apparatus at the reception side can superimpose a higher-resolution security code on the image and then print the image. This will not cause increases of transmitted data. Also, the MFP may embed information about a security code in the protocol, thereby enabling the image forming apparatus at the reception side to print the image after superimposing a higher-resolution security code thereon.

(Others)

Also, the processes according to the aforementioned embodiments may be executed with software or hardware circuits.

Further, programs which execute the processes of the flowcharts according to the aforementioned embodiments may be provided. Also, such programs may be recorded in a recording medium such as a CD-ROM, a flexible disk, a hard disk, a ROM, a RAM, a memory card, and the recording medium may be provided to a user. Also, such programs may be downloaded to the apparatus through a communication line such as the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus which receives facsimile information and outputs a printed image, the image forming apparatus comprising:
a security-code reading portion for reading a security code with a first resolution superimposed on received facsimile image data;
a security-code erasing portion for erasing said security code with the first resolution from said received facsimile image data;
a first security code creating portion for converting the content of the read security code into a security code with a second resolution different from the first resolution;
an image-data resolution converting portion for converting a resolution of said received facsimile image data with the security code erased therefrom; and
a first security-code superimposing portion for superimposing said security code with the second resolution on the converted facsimile image data.

2. The image forming apparatus according to claim 1, further comprising:
a security-information identification portion for identifying security information included in a received facsimile protocol;
a second security-code creating portion for creating a security code on the basis of said security information; and
a second security-code superimposing portion for superimposing said created security code on the converted facsimile image data.

3. An image forming apparatus which receives facsimile information and outputs a printed image, the image forming apparatus comprising:
a security-information identification portion for identifying security information included in a received facsimile protocol, wherein said security information is not included in facsimile image data associated with the received facsimile protocol;
a security-code creating portion for creating a security code on the basis of said security information;
an image-data resolution converting portion for converting a resolution of the received facsimile image data; and
a security-code superimposing portion for superimposing said created security code on the converted facsimile image data.

4. An image forming apparatus capable of transmitting an image as facsimile information, the image forming apparatus comprising:
an embedding portion for creating a security code and embedding said security code in image data to be transmitted;
a transmitting portion for transmitting the image data including said security code embedded therein;
a security-information transmission method determining portion for determining whether or not the apparatus at the reception side is capable of receiving security information as a protocol;
a security-information transmitting portion for transmitting security information as a protocol; and
a security-information transmission method selecting portion for, if the apparatus at the reception side is capable of receiving security information as a protocol, transmitting security information as a protocol or otherwise superimposing a security code on image data and then transmitting the image data.

5. A method for controlling an image forming apparatus which receives facsimile information and outputs a printed image, the method including:
a security-code reading step of reading a security code with a first resolution superimposed on received facsimile image data using a microprocessor;
a security-code erasure step of erasing said security code with the first resolution from said received facsimile image data;
a security-code creating step of converting the content of the read security code into a security code with a second resolution different from the first resolution;
an image-data resolution conversion step of converting a resolution of said received facsimile image data with the security code erased therefrom; and
a security-code superimposing step of superimposing said security code with the second resolution on the converted facsimile image data.

6. A method for controlling an image forming apparatus which receives facsimile information and outputs a printed image, the method comprising:
a security-information identification step of identifying security information included in the protocol of a received facsimile using a microprocessor, wherein said security information is not included in image data of the received facsimile;
a security-code creating step of creating a security code on the basis of said security information;
an image-data resolution conversion step of converting a resolution of the image data of the received facsimile; and
a security-code superimposing step of superimposing said created security code on said converted image data.

7. A method for controlling an image forming apparatus capable of transmitting an image as facsimile information, the method comprising:
an embedding step of creating a security code and embedding said security code in image data to be transmitted using a microprocessor;
a transmission step of transmitting the image data including said security code embedded therein;
a security-information transmission method determining step of determining whether or not the apparatus at the reception side is capable of receiving security information as a protocol;
a security-information transmission step of transmitting security information as a protocol; and
a security-information transmission method selecting step of, if the apparatus at the reception side is capable of receiving security information as a protocol, transmitting security information as a protocol or otherwise superimposing a security code on image data and then transmitting the image data.

8. A program stored on a non-transitory computer-readable medium for controlling an image forming apparatus which receives facsimile information and outputs a printed image, the program being adapted to cause a computer to execute:
a security-code reading step of reading a security code with a first resolution superimposed on received facsimile image data;
a security-code erasure step of erasing said security code with the first resolution from said received facsimile image data;
a security-code creating step of converting the content of the read security code into a security code with a second resolution different from the first resolution;

an image-data resolution conversion step of converting a resolution of said received facsimile image data with the security code erased therefrom; and a security-code superimposing step of superimposing said security code with the second resolution on the converted facsimile image data.

9. A program stored on a non-transitory computer-readable medium for controlling an image forming apparatus which receives facsimile information and outputs a printed image, the program being adapted to cause a computer to execute:

a security-information identification step of identifying security information included in the protocol of a received facsimile, wherein said security information is not included in image data of said received facsimile;

a security-code creating step of creating a security code on the basis of said security information;

an image-data resolution conversion step of converting a resolution of the image data of the received facsimile; and a security-code superimposing step of superimposing said created security code on the converted image data.

10. A program stored on a non-transitory computer-readable medium for controlling an image forming apparatus capable of transmitting an image as facsimile information, the program being adapted to cause a computer to execute:

an embedding step of creating a security code and embedding said security code in image data to be transmitted;

a transmission step of transmitting the image data including said security code embedded therein;

a security-information transmission method determining step of determining whether or not the apparatus at the reception side is capable of receiving security information as a protocol;

a security-information transmission step of transmitting security information as a protocol; and a security-information transmission method selecting step of, if the apparatus at the reception side is capable of receiving security information as a protocol, transmitting security information as a protocol or otherwise superimposing a security code on image data and then transmitting the image data.

* * * * *